US011978411B2

(12) United States Patent
L'Episcopo et al.

(10) Patent No.: US 11,978,411 B2
(45) **Date of Patent: *May 7, 2024**

(54) SYSTEM ARCHITECTURE FOR HIGH DENSITY MINI/MICRO LED BACKLIGHT APPLICATION

(71) Applicant: STMicroelectronics S.r.l., Agrate Brianza (IT)

(72) Inventors: Gaetano L'Episcopo, Catania (IT); Giovanni Conti, Acireale (IT); Carmelo Occhipinti, Paterno (IT); Mario Antonio Aleo, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 18/120,312

(22) Filed: Mar. 10, 2023

(65) Prior Publication Data

US 2023/0222984 A1 Jul. 13, 2023

Related U.S. Application Data

(63) Continuation of application No. 17/574,803, filed on Jan. 13, 2022, now Pat. No. 11,631,376.

(51) Int. Cl.
*G09G 3/34* (2006.01)
*G09G 3/36* (2006.01)

(52) U.S. Cl.
CPC ......... *G09G 3/3426* (2013.01); *G09G 3/3611* (2013.01); *G09G 2310/08* (2013.01); *G09G 2330/021* (2013.01)

(58) Field of Classification Search
None
See application file for complete search history.

(56) References Cited

U.S. PATENT DOCUMENTS 9,992,831 B1 * 6/2018 Tu .............................. G09G 5/10
10,971,086 B2 4/2021 Le et al.
(Continued)

FOREIGN PATENT DOCUMENTS

CN 113470588 A 10/2021
JP 2001147675 A * 5/2001
(Continued)

OTHER PUBLICATIONS

Cho, Daeyoun, et al: "A Novel Adaptive Dimming LED Backlight System With Current Compensated X-Y Channel Drivers for LCD TVs," IEEE Transactions on Circuits and Systems for Video Technology, Published 2014, 3 pages.
(Continued)

*Primary Examiner* — Kirk W Hermann
(74) *Attorney, Agent, or Firm* — Crowe & Dunlevy LLC

(57) ABSTRACT

A non-emissive display includes a backlight controller sending a pulse during each sub-frame of a plurality of frames to row and column drivers that drive backlight zones. The row drivers count each pulse to keep a pulse count total, and reset the pulse count total when it is equal to a first number indicating how many row drivers are present. Each row driver activates its channels and waits for a next pulse if the pulse count total is not equal to the first number and if the pulse count total is equal to a second number indicating in which sub-frame that first driver is to be activated. Each row driver waits for a next pulse if the pulse count total is not equal to the first number and the second number. Each column driver activates its channel in response to receipt of each pulse.

28 Claims, 7 Drawing Sheets

(56) References Cited

U.S. PATENT DOCUMENTS

| | | | | |
|---|---|---|---|---|
| 11,081,070 | B2 | 8/2021 | Calayir et al. | |
| 2008/0284354 | A1 * | 11/2008 | Chen | H05B 45/30 315/294 |
| 2010/0231573 | A1 * | 9/2010 | Adachi | G09G 3/3426 345/102 |
| 2011/0248974 | A1 | 10/2011 | Murai et al. | |
| 2013/0002529 | A1 * | 1/2013 | Onogi | G09G 3/36 315/250 |
| 2013/0265348 | A1 * | 10/2013 | Onogi | G09G 5/10 345/691 |
| 2014/0306873 | A1 * | 10/2014 | Yamashita | G09G 3/3426 345/102 |
| 2019/0244572 | A1 * | 8/2019 | Le | G09G 3/3406 |
| 2020/0090608 | A1 | 3/2020 | Calayir et al. | |
| 2021/0225297 | A1 * | 7/2021 | Shi | G09G 3/2092 |
| 2022/0114975 | A1 * | 4/2022 | Kim | G09G 3/3426 |

FOREIGN PATENT DOCUMENTS

| | | | |
|---|---|---|---|
| JP | 2001147675 | A | 5/2001 |
| JP | 6128741 | B2 * | 5/2017 |

OTHER PUBLICATIONS

Huang, Che-Hsuan, et al: “Research on a Novel GaN-Based Converted Mini-LED Backlight Module via a Spectrum-Decouple System,” IEEE Access, vol. 8, 2020, 11 pages.

* cited by examiner

SYSTEM ARCHITECTURE FOR HIGH DENSITY MINI/MICRO LED BACKLIGHT APPLICATION

CROSS REFERENCE TO RELATED APPLICATION

This application is a continuation of U.S. patent application Ser. No. 17/574,803, filed Jan. 13, 2022, the contents of which are incorporated by reference in their entirety to the maximum extent allowable under the law.

TECHNICAL FIELD

This disclosure is related to the field of display technology and, in particular, to an architecture for driving a light emitting diode (LED) based backlight of a non-emissive display in a way that permits control of a greater number of zones without consuming excess area.

BACKGROUND

Many electronic devices, such as smartphones, smartglasses, smartwatches, tablets, laptops, monitors, and televisions utilize display panels for the purposes of displaying information to users. Such display panels are organized into a two-dimensional matrix of rows and columns, with the intersections between rows and columns representing display elements such as zones (in the case of non-emissive displays) and pixels (in the case of an emissive display).

This disclosure concerns non-emissive display panels. A sample type of non-emissive display is a liquid crystal display (LCD), commonly used in televisions for example, and a sample type of emissive display is an organic light emitting diode (OLED) display, commonly used in smartphones for example.

A sample LCD based non-emissive display panel 12 incorporated into a free-standing display 10 is shown in FIG. 1A. The non-emissive display panel 12 is formed by a two-dimensional matrix of display zones, with a sample display zone being indicated by reference numeral 15. Each display zone 15 contains multiple pixels, with each pixel containing at least one red sub-pixel, at least one green sub-pixel, and at least one blue sub-pixel.

The illustrated display zone 15 is representative of each of the display zones within the non-emissive display panel 12, and includes a liquid crystal LC 16*a* for modulating display of the color red, a liquid crystal LC 16*b* for modulating display of the color green, and a liquid crystal LC 16*c* for modulating display of the color blue. The liquid crystals 16*a*-16*c* are arranged over a backlight for that zone, which here is formed by one or more light emitting diodes (LEDs) 17.

Additionally or alternatively, the liquid crystals 16*a*, 16B, and 16*c* may modulate the display of colors other than red, green, and blue. Also, the LEDs 16*a*-16*c* may be connected in series and/or parallel.

The specific layer structure forming the non-emissive display panel 12 can be seen in FIG. 1B, where it can be observed that a backlight backpane 13 carries backlight LEDs 17, with a color conversion and diffusion layer 19 being disposed over the backlight LEDs 17. The backlight LEDs 17 may be so-called "mini" or "micro" LEDs. The liquid crystals 16 are disposed over the color conversion and diffusion layer 19 (or multiple color conversion and diffusion layers), and a display glass layer 18 is disposed over the liquid crystals 16. The backlight backpane 13 and LEDs 17 can be collectively referred to as a matrix 14.

Images are produced by the LEDs 17 emitting light which is then converted by the color conversion and diffusion layer 19 into different beams of red, green, and blue light (or, for example, beams of light in colors other than red, green, and blue) which in turn pass through the liquid crystals 16 and out of the display glass 18. A voltage across each individual liquid crystal 16 is modulated, causing those individual liquid crystals to change in transparency, thereby modulating the amount of light passing through those liquid crystals. Different colors are displayed by operation of the liquid crystals 16 modulating the intensity of the red, green, and blue light beams (or other colored light beams, as described above) as they pass therethrough. Since the source of the light itself is the LEDs 17 with a given zone, and not the pixels within that given zone, the display panel 12 is considered to be non-emissive (e.g., have non-emissive pixels located within emissive zones, with each zone providing light to multiple pixels).

In operation, each zone is addressed by the simultaneous activity of a corresponding row driver and column driver for that zone, resulting in current flow from the row driver, through the LEDs of the zone, to the column driver; alternatively, the current flow may be from the column driver, through the LEDs of the zone, to the row driver. This current flow may be in the form of pulses, modulated by their amplitude or width. Activation is divided into different frames, with row activation being multiplexed over each frame, with one or more rows being activated at the same time, and column activation being synchronized with row activation; alternatively, column activation may be multiplexed over each frame, with one or more columns being activated at the same time, and row activation may be multiplexed over each time frame.

Display panels today are ever increasing in the number of backlight zones present, with the result being that the LEDs in those backlight zones are ever decreasing in size. As a result, there is an increase in the number of row and column drivers for operating these backlight zones, consuming area while increasing complexity and cost. As such, further development is needed.

SUMMARY

Disclosed herein is a display, including: a plurality of first drivers, each first driver having multiple channels; a plurality of second drivers, each second driver having at least one channel; a matrix of display elements arranged into first lines and second lines of backlight zones, with each first line being coupled between one of the multiple channels of one of the plurality of first drivers and the at least one channel of one of the plurality of second drivers; and a backlight controller coupled to the plurality of first drivers and the plurality of second drivers.

The backlight controller is configured to send a synchronization signal indication during each sub-frame of a plurality of frames to the plurality of first drivers and the plurality of second drivers.

Each first driver is configured to: count each synchronization signal indication received to thereby keep a synchronization signal indication count total; reset the synchronization signal indication count total when the synchronization signal indication count total is equal to a first number indicating how many first drivers are in the plurality of first drivers; activate its multiple channels and then wait for a next synchronization signal indication when the synchronization signal indication count total is not equal to the first number, and the synchronization signal indication count total is equal to a second number, said second number indicating in which sub-frame the first driver is to be activated; and wait for a next synchronization signal indication when the synchronization signal indication count total is not equal to the first number and the synchronization signal indication count total is not equal to the second number.

Each second driver is configured to activate its at least one channel in response to receipt of each synchronization signal indication.

The plurality of first drivers may include a plurality of row drivers, the first lines of backlight zones may include rows of backlight zones, the plurality of second drivers may include a plurality of column drivers, and the second lines of backlight zones may include columns of backlight zones.

The plurality of second drivers may include a plurality of row drivers, the second lines of backlight zones may include rows of backlight zones, the plurality of first drivers may include a plurality of column drivers, and the first lines of backlight zones may include columns of backlight zones.

The synchronization signal indication may be a pulse, a bit, or bytes.

The backlight controller may send the synchronization signal indication at a beginning of each sub-frame of each of the plurality of frames.

The backlight controller may send the synchronization signal indications over a first bus to the plurality of first drivers and plurality of second drivers.

The plurality of first drivers and plurality of second drivers may send signals to the backlight controller over a second bus.

A first daisy chain connection may be formed between the plurality of first drivers and the plurality of second drivers, with the plurality of first drivers and the plurality of second drivers sending signals to the backlight controller through the first daisy chain connection.

A second daisy chain connection may be formed between the plurality of first drivers and the plurality of second drivers, with the backlight controller sending the synchronization signal indications to the plurality of first drivers and the plurality of second drivers through the second daisy chain connection.

A first daisy chain connection may be formed between the plurality of first drivers and the plurality of second drivers, with the plurality of first drivers and the plurality of second drivers sending signals to the backlight controller through the first daisy chain connection.

Also disclosed herein is a display, including: a plurality of first drivers, each first driver having multiple channels; a daisy chain connection formed between the plurality of first drivers; a plurality of second drivers, each second driver having at least one channel; a matrix of display elements arranged into first lines and second lines of backlight zones, with each first line of backlight zones being coupled between one of the multiple channels of one of the plurality of first drivers and the at least one channel of one of the plurality of second drivers; and a backlight controller coupled to the plurality of first drivers and the plurality of second drivers.

The backlight controller is configured to send a synchronization signal indication to the plurality of first drivers and the plurality of second drivers during each sub-frame of a plurality of frames.

Each first driver is configured to: activate the multiple channels of the first driver and output a trigger signal pulse to the daisy chain then wait for a next synchronization signal indication, when a received synchronization signal indication is a first synchronization signal indication received after start of a current frame and the first driver is to be activated in the first sub-frame of each frame; activate the multiple channels of the first driver and output a trigger signal pulse to the daisy chain then wait for a next synchronization signal indication, when a received synchronization signal indication is a first synchronization signal indication received after start of a current frame, the first driver is not to be activated in the first sub-frame of each frame, a trigger signal pulse was received by the first driver after receipt of the synchronization signal indication, a received synchronization signal indication is not a first synchronization signal indication received after start of a current frame, and a trigger signal pulse was received by the first driver after receipt of the synchronization signal indication; and wait for a next synchronization signal indication, when a received synchronization signal indication is not a first synchronization signal indication received after start of a current frame and a trigger signal pulse was not received by the first driver after receipt of the synchronization signal indication.

Each second driver is configured to activate its at least one channel in response to receipt of each synchronization signal indication.

The plurality of first drivers may include a plurality of row drivers, the first lines of backlight zones may include rows of backlight zones, the plurality of second drivers may include a plurality of column drivers, and the second lines of backlight zones may include columns of backlight zones.

The plurality of second drivers may include a plurality of row drivers, the second lines of backlight zones may include rows of backlight zones, the plurality of first drivers may include a plurality of column drivers, and the first lines of backlight zones may include columns of backlight zones.

The synchronization signal indication may be a pulse, a bit, or a byte.

The backlight controller may send the synchronization signal indication at a beginning of each sub-frame of each of the plurality of frames.

The backlight controller may send the synchronization signal indications over a first bus to the plurality of first drivers and plurality of second drivers.

The plurality of first drivers and plurality of second drivers may send signals to the backlight controller over a second bus A first daisy chain connection may be formed between the plurality of first drivers and the plurality of second drivers, with the plurality of first drivers and the plurality of second drivers sending signals to the backlight controller through the first daisy chain connection.

A second daisy chain connection may be formed between the plurality of first drivers and the plurality of second drivers, with the backlight controller sending the synchronization signal indications to the plurality of first drivers and the plurality of second drivers through the second daisy chain connection.

A first daisy chain connection may be formed between the plurality of first drivers and the plurality of second drivers, with the plurality of first drivers and the plurality of second drivers sending signals to the backlight controller through the first daisy chain connection.

Also disclosed herein is a display system, including: a plurality of drivers, each having multiple channels; a matrix of display elements arranged into rows and columns of backlight zones, with each row being coupled between one of the multiple channels of one of the plurality of drivers; and a backlight controller coupled to the plurality of drivers, configured to send a synchronization signal indication during each sub-frame of a plurality of frames to the plurality of drivers. Each driver counts each synchronization signal indication received, resets the count when it equals a number of the plurality of drivers, and activates its channels based on the count and a second number indicating the sub-frame in which the driver is to be activated.

Each driver may wait for a next synchronization signal indication when the count is not equal to the number of the plurality of drivers.

Each driver may wait for a next synchronization signal indication when the count is not equal to the second number.

The plurality of drivers may be a plurality of row drivers.

The synchronization signal indication may be a pulse.

The display system may include a first bus over which the backlight controller sends the synchronization signal indications to the plurality of drivers at a beginning of each sub-frame of each of the plurality of frames.

Also disclosed herein is a display, including: a plurality of first drivers, each having multiple channels; a plurality of second drivers, each having at least one channel; a matrix of display elements arranged into first and second lines of backlight zones, with each first line being coupled between one of the multiple channels of one of the first drivers and the at least one channel of one of the second drivers; and a backlight controller coupled to the first and second drivers and sending a synchronization signal indication during each sub-frame of a plurality of frames. Each first driver counts and resets the synchronization signal indications based upon the count, activates its channels based on the count, and waits for a next synchronization signal indication. Each second driver activates its channels in response to each synchronization signal indication.

The plurality of first drivers may be row drivers and the plurality of second drivers may be column drivers, with the first lines and second lines of backlight zones being rows and columns, respectively.

The plurality of second drivers may be row drivers and the plurality of first drivers may be column drivers, with the second lines and first lines of backlight zones comprising rows and columns, respectively.

The synchronization signal indication may be a pulse.

The backlight controller may send the synchronization signal indication at a beginning of each sub-frame of each frame.

A first bus for the backlight controller may send the synchronization signal indications and a second bus for the plurality of first drivers and plurality of second drivers may send signals to the backlight controller.

The plurality of first drivers and plurality of second drivers may send signals to the backlight controller through a first daisy chain connection.

The plurality of first drivers and plurality of second drivers may send signals to the backlight controller through a first daisy chain connection.

The backlight controller may send the synchronization signal indications to the plurality of first drivers and plurality of second drivers through a second daisy chain connection.

The plurality of first drivers and plurality of second drivers may send signals to the backlight controller through a first daisy chain connection.

Also disclosed herein is a method of driving a matrix of display elements arranged in first and second lines of backlight zones, with each first line being coupled between a plurality of first drivers and a plurality of second drivers. The method includes: sending a synchronization signal indication during each sub-frame of multiple frames to the first drivers and second drivers; counting and resetting synchronization signal counts for each first driver; activating multiple channels of a first driver when the count is not equal to a first number and equal to a second number; and activating at least one channel of each second driver in response to each synchronization signal indication.

Each first driver may wait for a next synchronization signal indication when the count is neither equal to the first number nor the second number.

The synchronization signal indication may be sent at a beginning of each sub-frame of the frames.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein. Do note that in the below description, any described resistor or resistance is a discrete device unless the contrary is stated, and is not simply an electrical lead between two points. Thus, any described resistor or resistance coupled between two points has a greater resistance than a lead between those two points would have, and such resistor or resistance cannot be interpreted to be a lead. Similarly, any described capacitor or capacitance is a discrete device unless the contrary is stated, and is not a parasitic unless the contrary is stated. Moreover, any described inductor or inductance is a discrete device unless the contrary is stated, and is not a parasitic unless the contrary is stated.

Figure 1A:
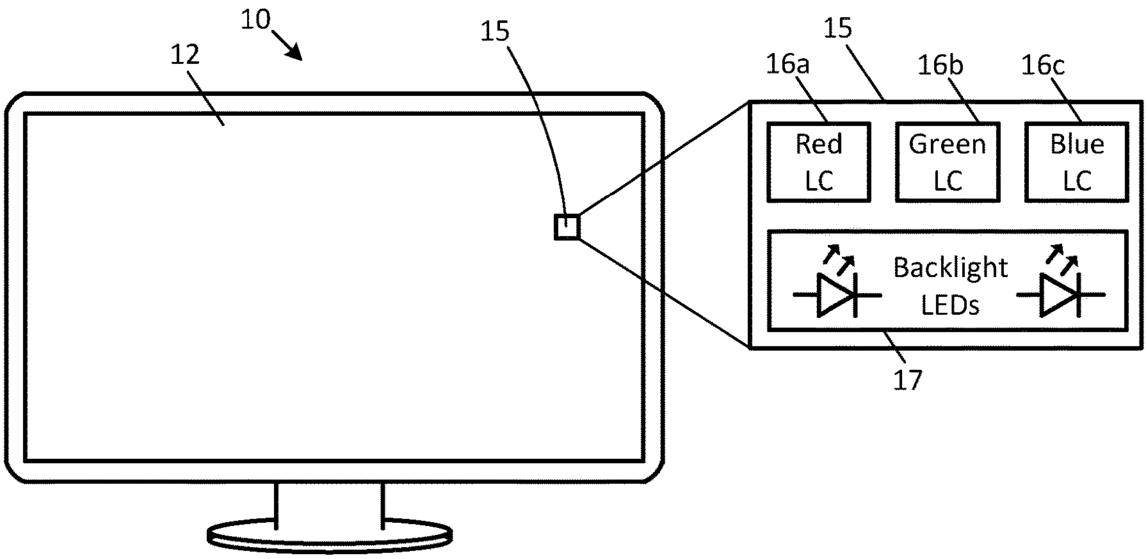
FIG. 1A (Prior Art)
FIG. 1A is a diagrammatical representation of a known non-emissive display.
Figure 1B:
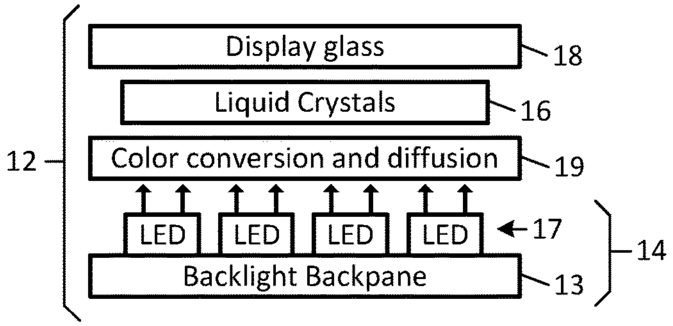
FIG. 1B (Prior Art)
FIG. 1B is a diagrammatical representation of cross section of the non-emissive display of FIG. 1A.
Figure 2:
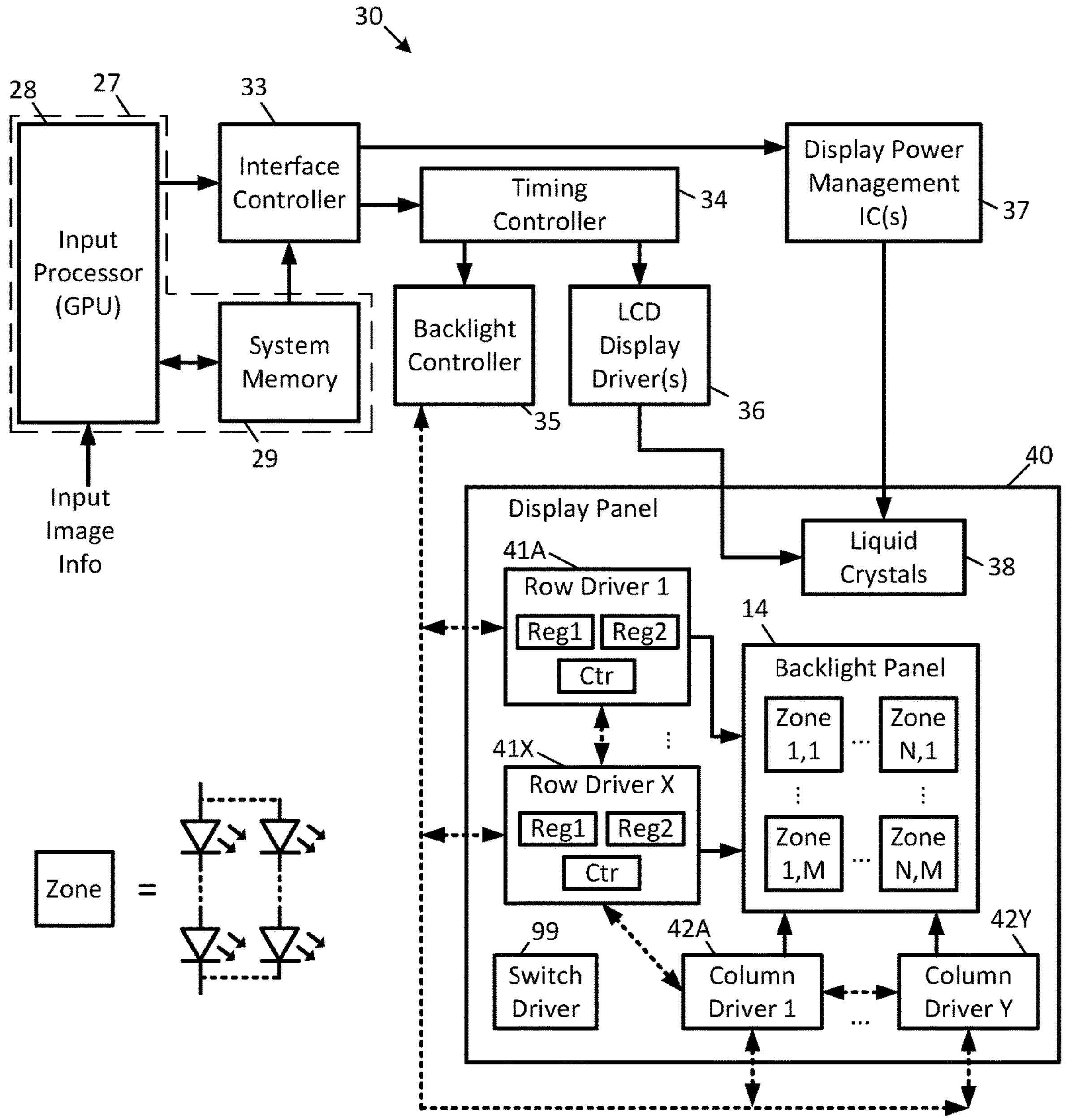
FIG. 2 is a block diagram of a non-emissive display disclosed herein.

A design for a display 30 utilizing a non-emissive display panel 40 is now described with reference to FIG. 2. The display 30 includes an interface controller 33 that receives input from an external device 27, such as a system-on-a-chip (SOC) or microcontroller including an input processor 28 (such as a GPU) and a system memory 29 in bidirectional communication with the input processor 28. The input processor 28 receives input image information and cooperates with the system memory 29 to generate an output to the interface controller 33 indicating the next frame of image data to be displayed by the display panel 40. The interface controller 33 processes the output from the input processor 28, and provides outputs to a timing controller 34 and display power management circuitry 37. The timing controller 34 coordinates with the backlight controller 35 to provide control signals to the row drivers 41A, . . . , 41X and column drivers 42A, . . . , 42Y associated with zones of the backlight panel 14. The backlight panel 14 is divided into an array of N×M zones. Each of the illustrated zones within the backlight panel 14 may include multiple serially connected LEDs, and those LED strings may be connected in parallel with one another. The LCD display drivers 36 provide control signals to the liquid crystals 38 to enable coordination between the backlight panel 14 and the liquid crystals 38 so as to achieve image display. The display panel 40 includes a switch driver 99 for controlling switches within the display panel 40.

In some instances the row drivers 41A, . . . , 41X may be incorporated into one or more row drivers, the column drivers 42A, . . . , 42Y may be incorporated into one or more column drivers, and these one or more row drivers and these one or more column drivers may be integrated in or on the backlight panel 14.

Each row driver 41A, . . . , 41X may be a single integrated circuit, or may occupy a given area within an integrated circuit, and may include at least two registers Reg1, Reg2 and a counting circuit Ctr.

The details of the interconnections within the display panel 40 will be described below.

Regarding the connections between the row drivers 41A, . . . , 41X and the zones, and the connections between the column drivers 42A, . . . , 42Y and the zones, the electrical arrangement may be such that each row driver 41A, . . . , 41X is coupled to the anodes of the LEDs within the zones of the rows it services, and such that each column driver 42A, . . . , 42Y is coupled to the cathodes of the LEDs within the zones of the columns it services. As an alternative, the electrical arrangement may be such that each row driver 41A, . . . , 41X is coupled to the cathodes of the LEDs within the zones of the rows it services, and such that each column driver 42A, . . . , 42Y is coupled to the anodes of the LEDs within the zones of the columns it services.

Figure 3:
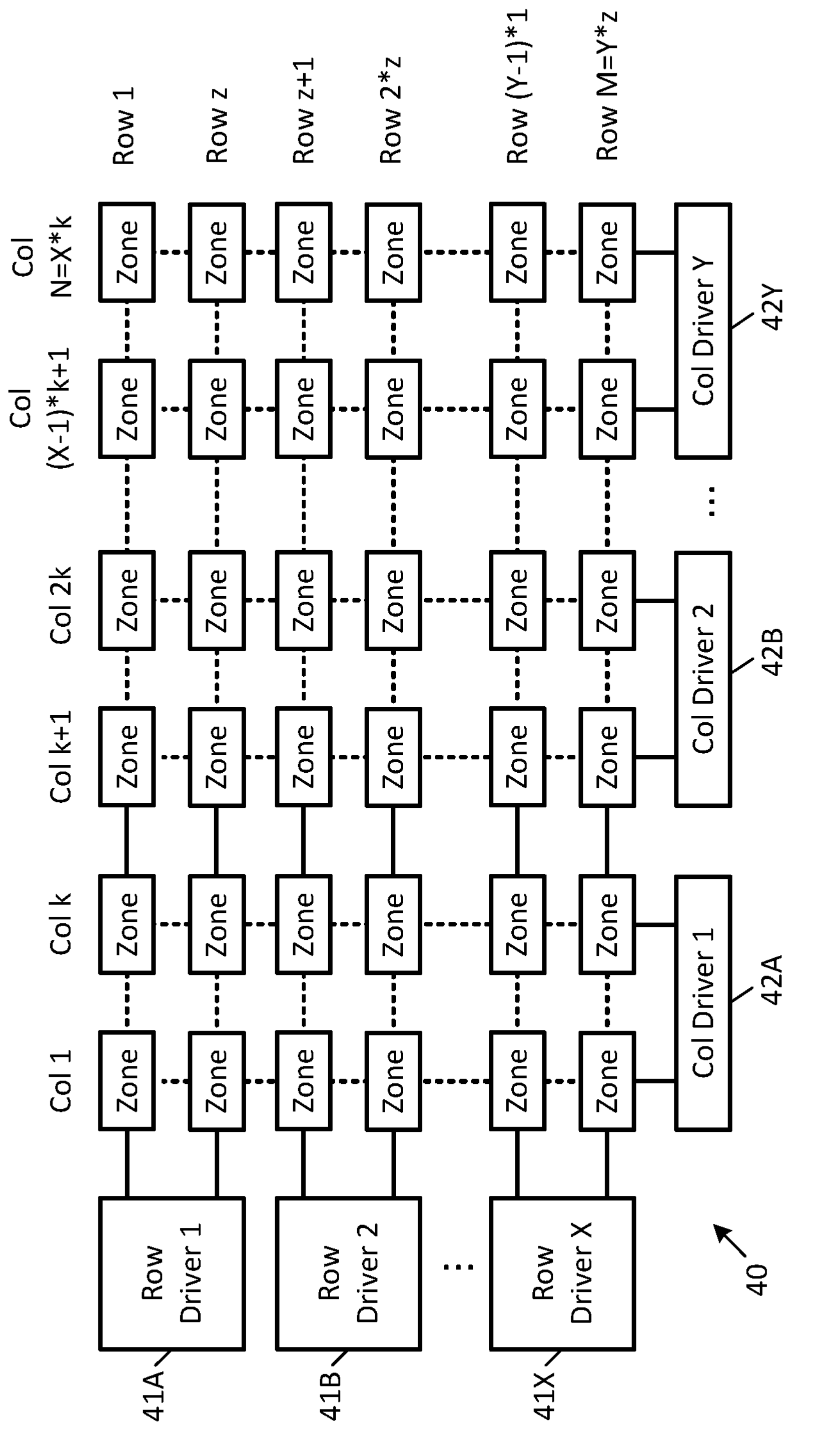
FIG. 3 is a diagrammatical representation of a display matrix of the display of FIG. 2.

A genericized block diagram of the display panel 40 is shown in FIG. 3. Here, the display panel 40 includes a matrix of N×M zones. X row drivers 41A, . . . , 41X each have z channels (e.g., row driver 41A has z channels and therefore operates z rows, row driver 41B has z channels and therefore operates z rows, etc.). Y column drivers 42A, . . . , 42Y each have k channels (e.g., column driver 42A has k channels and therefore operates k rows, column driver 42B has k channels and therefore operates k rows, etc.). The number z of channels possessed by each row driver 41A, . . . , 41X may be any suitable integer, and the number k of channels possessed by each column driver 42A, . . . , 42Y may be any suitable integer, and z and k need not be equal to one another (but may be if desired). The number of channels z of the X row drivers 41A, . . . , 41X could be different from row driver to row driver. In the same way, the number of channels k of the Y column drivers could be different from column driver to column driver.

The interconnections between the backlight controller 35 and the row drivers 41A, . . . , 41X and column drivers 42A, . . . , 42Y for operating according to a first technique will now be described with additional reference to FIG. 4.

Figure 4:
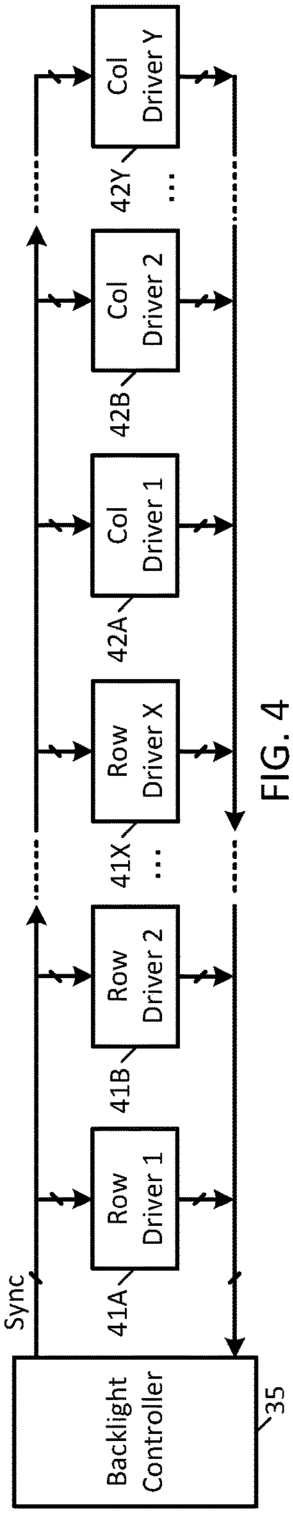
FIG. 4 is a block diagram showing a first embodiment of interconnections between the backlight controller, row drivers, and column drivers of FIG. 3.

In a first possible configuration, shown in FIG. 4, a first bus carries data and control signals from the backlight controller 35 to the row drivers 41A, . . . , 41X and column drivers 42A, . . . , 42Y, while a second bus carries data and control signals back from the row drivers 41A, . . . , 41X and column drivers 42A, . . . , 42Y to the backlight controller. The control signals sent by the backlight controller 35 over the first bus to the row and column drivers include a synchronization signal Sync, which is described as arriving below in the form of pulses, but may instead be a digital signal if desired.

Figure 5:
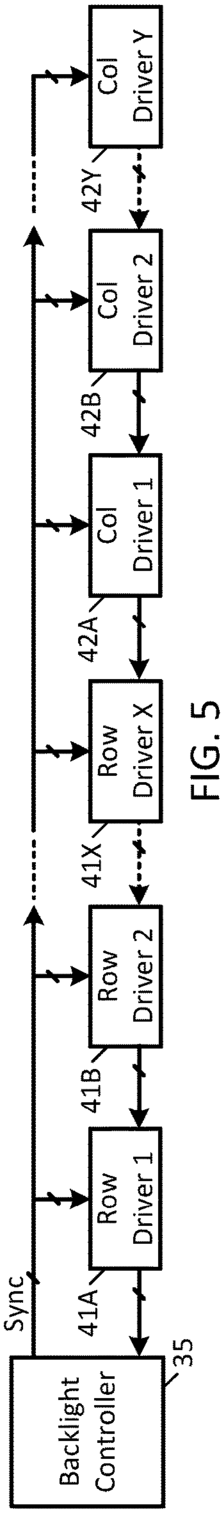
FIG. 5 is a block diagram showing a second embodiment of interconnections between the backlight controller, row drivers, and column drivers of FIG. 3.

In a second possible configuration, shown in FIG. 5, a bus carries data and control signals from the backlight controller 35 to the row drivers 41A, . . . , 41X and column drivers 42A, . . . , 42Y, while a daisy chain connection carries data and control signals from the row drivers 41A, . . . , 41X and column drivers 42A, . . . , 42Y to the backlight controller 35. The daisy chain connection begins with the last column driver 42Y, through the second to last column driver 42B, and so on until it reaches the first column driver 42A. The daisy chain connection continues from the first column driver 42A to the last row driver 41X, through the second to last row driver 41B, and so on until it reaches the first row driver 41A. The output of the daisy chain connection is passed from the first row driver 41A to the backlight controller 35. Data and control signals generated and sent by an upstream driver pass through each downstream driver until they are passed to the backlight controller. For example, data and control signals generated by the last column driver 42Y are passed to the second to last column driver 42B, and so on until they are passed to the first row driver 41A, and then from the first row driver 41A to the backlight controller 35. Similarly, data and control signals generated by the second to last column driver 42B are passed sequentially through the preceding column drivers (here, 42A) to the last row driver 42Y, and from the last row driver 42Y are passed sequentially through the preceding row drivers (here, 41B and 41A), and then on to the backlight controller 35. The control signals sent by the backlight controller 35 over the bus to the row and column drivers include a synchronization signal Sync, which is described as arriving below in the form of pulses, but may instead be a digital signal if desired.

Figure 6:
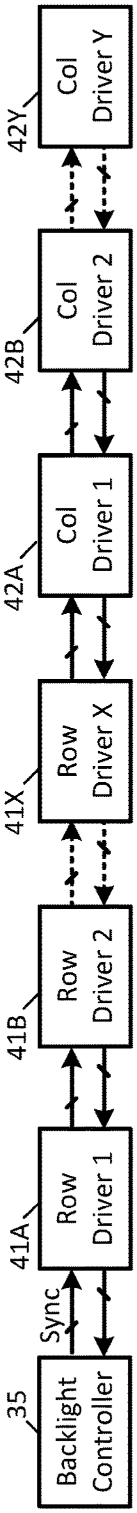
FIG. 6 is a block diagram showing a third embodiment of interconnections between the backlight controller, row drivers, and column drivers of FIG. 3.

In a third possible configuration, shown in FIG. 6, a first daisy chain connection carries data and control signals from the backlight controller 35 to the row drivers 41A, . . . , 41X and column drivers 42A, . . . , 42Y. This daisy chain connection begins with the first row driver 41A connected to receive input from the backlight controller 35 and extends through each row driver in turn until it reaches the first column driver 42A, and extends through each column driver in turn until it reaches the last column driver 42Y. A second daisy chain connection carries data and control signals from the row drivers 41A, . . . , 41X and column drivers 42A, . . . , 42Y to the backlight controller 35. This daisy chain connections begins with the last column driver 42Y extends through each column driver in turn until it reaches the first column driver 42A, extends from the first column driver 42A to the last row driver 41X, extends form the last row driver 41X until it reaches the first row driver 41A, and extends from the first row driver 41A to provide output to the backlight controller 35. The control signals sent by the backlight controller 35 over the first daisy chain connection to the row and column drivers include a synchronization signal Sync, which is described as arriving below in the form of pulses, but may instead be a digital signal if desired.

The position of the row drivers 41A, . . . , 41X and column drivers 42A, . . . , 42Y in the displayed buses and daisy chains could change in FIGS. 4-6. For example, the first element on the right could be a row driver, followed by a column driver, two row drivers, another column driver, etc.

Figure 7:
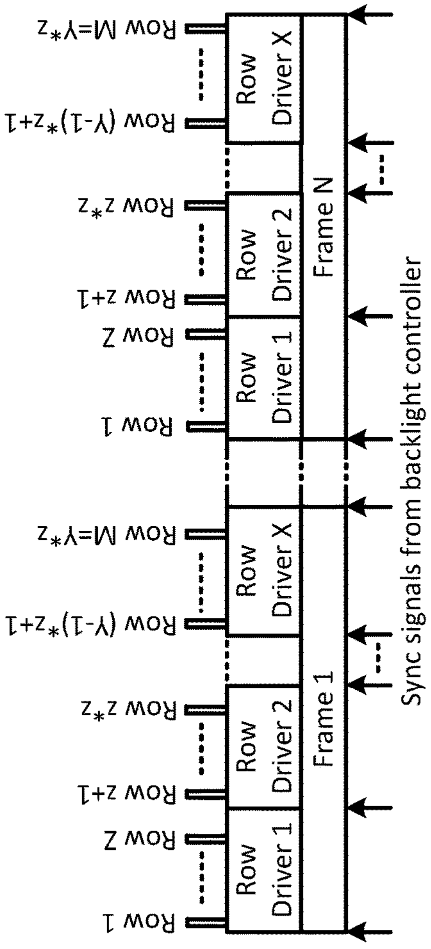
FIG. 7 is a diagrammatical representation of time division operation of the display matrix of FIG. 3.

In general, operation proceeds with one row driver 41A, . . . , 41X at a time being operated, under control of the backlight controller 35. As shown in FIG. 7, operation is divided into frames, with each frame being divided into a number of sub-frames equal to the number of row drivers 41A, . . . , 41X. During each sub-frame, a different row driver 41A, . . . , 41X is actuated, such that each row driver is actuated during a different sub-frame of each frame. During each sub-frame, the given row driver 41A, . . . , 41X associated with that sub-frame activates each of its channels (and thus their associated rows) in a given order (e.g., sequential order, non-sequential order), such that one channel is activated at a time. Each column driver 42A, . . . , 42Y is actuated when each channel (and its associated rows) of a row driver 41A, . . . , 41X is actuated.

Figure 8:
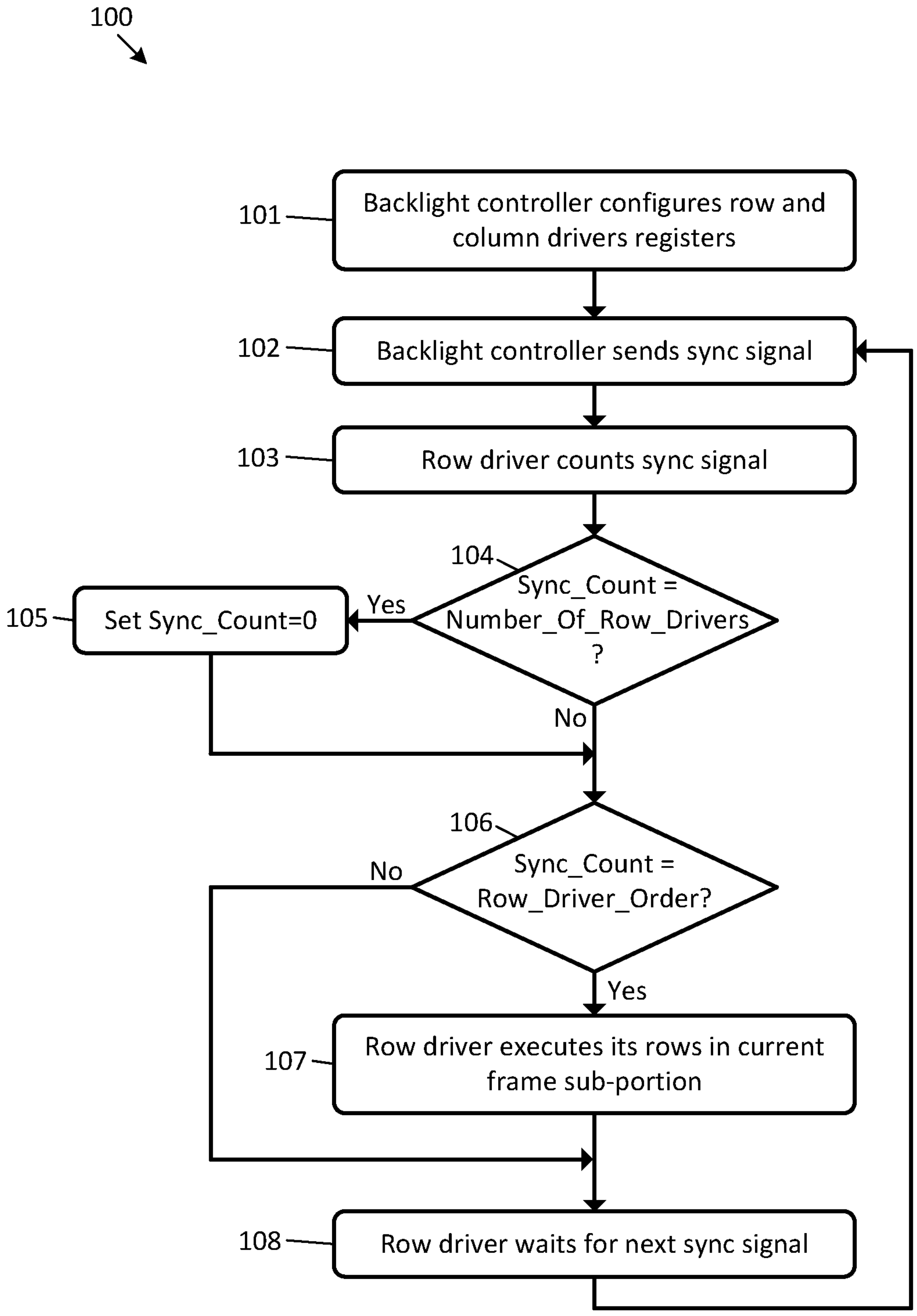
FIG. 8 is a flowchart showing a first technique for operating the display matrix of FIG. 3 when the backlight controller, row drivers, and column drivers are connected as shown in FIGS. 4-6.

Operation details are now given with additional reference to the flowchart 100 of FIG. 8. Initially, at either the beginning of each frame, or at another suitable time (e.g., at power-on of the device into which the display 30 is incorporated), the backlight controller 35 sends configuration signals to the row drivers 41A, . . . , 41X (Block 101). These configuration signals, for each row driver 41A, . . . , 42Y sets the first register Reg1 to be equal to the total number of row drivers 41A, . . . , 41X present (designated as Number_Of_Row_Drivers), the value in Reg1 varying from 0 which indicates the presence of only one row driver to X-1 which indicates the presence of X row drivers. The configuration signals, for each row driver 41A, . . . , 42Y also sets the second register Reg2 to the position of that individual row driver in an execution sequence for the row drivers (designated Row_Driver_Order)—the value that may be held by the registers Reg2 varies from 0 which indicates that a given row driver is to be activated during the first sub-period of each period to Z-1 which indicates that the given row driver is to be activated during the last sub-period of the each period.

At the beginning of each sub-frame, the backlight controller 35 sends a sync signal pulse to the row drivers 41A, . . . , 41X and the column drivers 42A, . . . , 42Y (Block 102). The counting circuit Ctr within each row driver 41A, . . . , 41X counts the number of sync signal pulses that have been received during the period (Block 103). If the number of sync signal pulses received (designated as Sync_Count) is equal to the total number of row drivers Number_Of_Row_Drivers (Block 104), then the row drivers 41A, . . . , 41X reset Sync_Count in their counting circuits Ctr back to 0 (Block 105). If the number Sync_Count of sync signal pulses received by a given row driver 41A, . . . , 41X is equal to the position of that row driver in the execution sequence Row_Driver_Order (Block 106), then that row driver actuates each of its channels in a given channel order (for example, sequentially) during the current sub-frame (Block 107). If Sync_Count is not equal to Row_Driver_Order, or if it was and the step in Block 107 has been executed, then the given row driver waits for the next sync signal pulse (Block 108).

The column drivers 42A, . . . , 42Y actuate their channels concurrently with actuation of the channels of each row driver 41A, . . . , 41X according to image data received from the backlight controller 35. This way, the lighting provided by each zone can be controlled by the image data—zones where their associated pixels are intended to show blacks can remain unilluminated, while zones where their associated pixels are intended to have varying intensities can each have their own intensities set independently.

Figure 9:
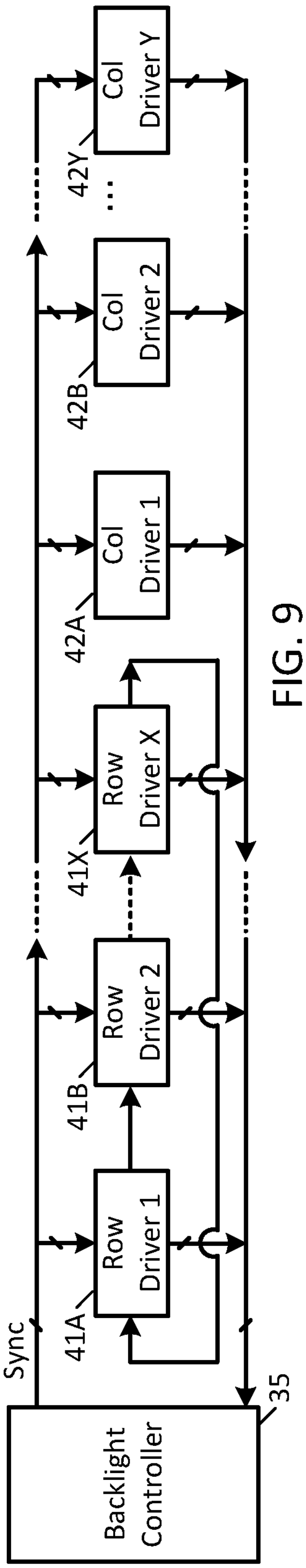
FIG. 9 is a block diagram showing a fourth embodiment of interconnections between the backlight controller, row drivers, and column drivers of FIG. 3.
Figure 10:
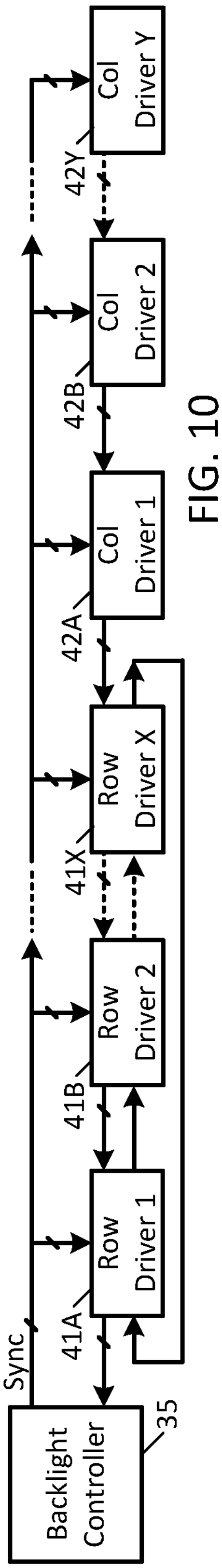
FIG. 10 is a block diagram showing a fifth embodiment of interconnections between the backlight controller, row drivers, and column drivers of FIG. 3.
Figure 11:
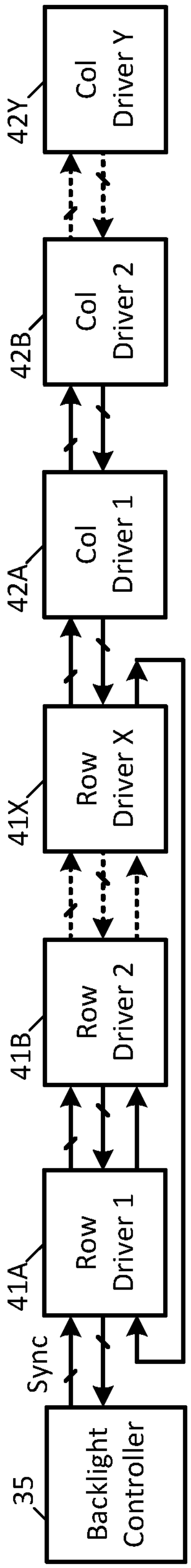
FIG. 11 is a block diagram showing a sixth embodiment of interconnections between the backlight controller, row drivers, and column drivers of FIG. 3.
Figure 12:
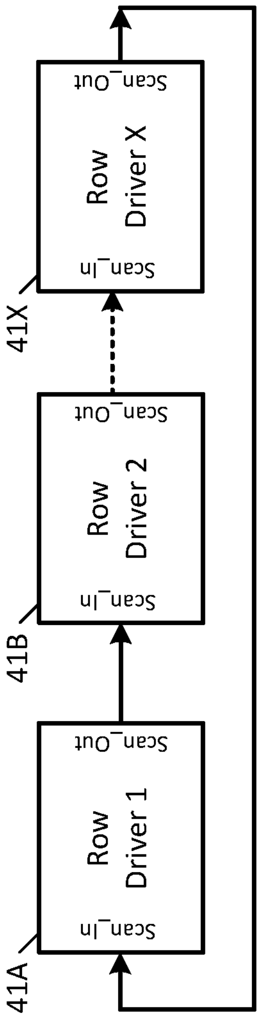
FIG. 12 is a block diagram showing further details of the row drivers of the embodiments of FIGS. 9-11.

The interconnections between the backlight controller 35 and the row drivers 41A, . . . , 41X and column drivers 42A, . . . , 42Y for operating according to a second technique will now be described with additional reference to FIGS. 9-12. In these embodiments described below, the register Reg2 within each row driver 41A, . . . , 42Y may be a single bit register. Beyond that, the configuration of FIG. 9 is the same as that of FIG. 4, except here a daisy chain connects the row drivers 41A, . . . , 41X in a ring, with the row driver 41A being the first row driver in the daisy chain and row driver 41X being the last row driver in the daisy chain, this daisy chain connection being used for transmission of trigger signal pulses generated by the row drivers. Similarly, the configuration of FIG. 10 is the same as that of FIG. 5, except here a second daisy chain connects the row drivers 41A, . . . , 41X in a ring, with the row driver 41A being the first row driver in the second daisy chain and row driver 41X being the last row driver in the second daisy chain, this second daisy chain connection being used for transmission of trigger signal pulses generated by the row drivers. Likewise, the configuration of FIG. 11 is the same as that of FIG. 6, except here a third daisy chain connects the row drivers 41A, . . . , 41X in a ring, with the row driver 41A being the first row driver in the third daisy chain and row driver 41X being the last row driver in the daisy chain, this third daisy chain connection being used for transmission of trigger signal pulses generated by the row drivers. As shown in FIG. 12, each row driver 41A, . . . , 41X has a SCAN_IN input to receive trigger signal pulses and a SCAN_OUT output at which trigger signal pulses are generated or passed on.

Figure 13:
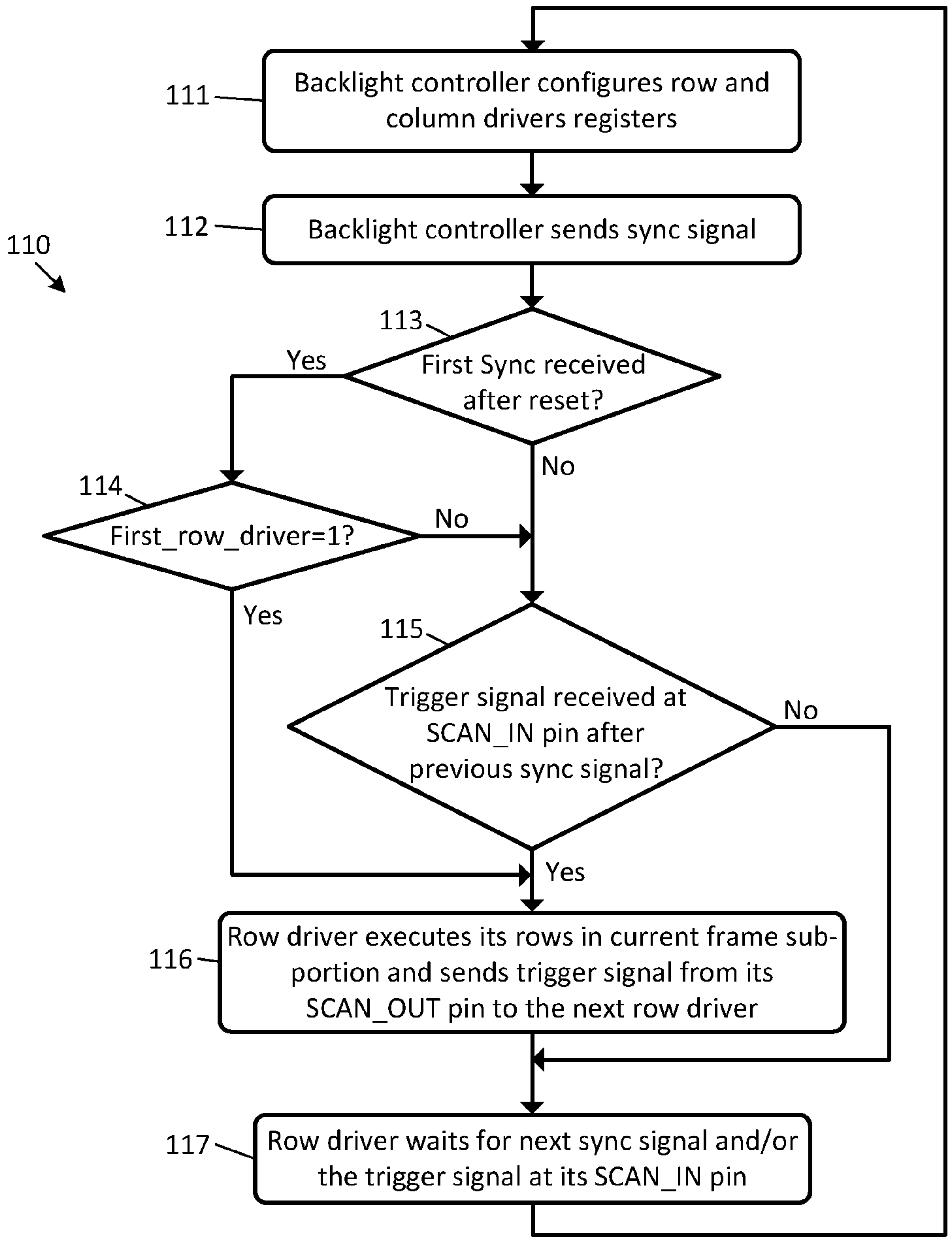
FIG. 13 is a flowchart showing a second technique for operating the display matrix of FIG. 3 when the backlight controller, row drivers, and column drivers are connected as shown in FIGS. 9-12.

Operation details are now given with additional reference to the flowchart 110 of FIG. 13. Initially, at either the beginning of each frame, or at another suitable time (e.g., at power-on of the device into which the display 30 is incorporated), the backlight controller 35 sends configuration signals to the row drivers 41A, . . . , 41X (Block 111). These configuration signals, for each row driver 41A, . . . , 42Y set the first register Reg1 to the total number of row drivers 41A, . . . , 41X present (designated as Number_Of_Row_Drivers), the value in Reg1 varying from 0 which indicates the presence of only one row driver to X-1 which indicates the presence of X row drivers. The configuration signals, for each row driver 41A, . . . , 42Y also set the second register Reg2 to an indication of whether that row driver 41A, . . . , 42Y is the first row driver to be actuated in every period (e.g., is to be actuated during the first sub-periods). If a given row driver 41A, . . . , 42Y is to be actuated first in each period, then its register Reg2 is set to a value of 1, and otherwise its register Reg2 is set to a value of 0.

At the beginning of each sub-frame, the backlight controller 35 sends a sync signal pulse to the row drivers 41A, . . . , 41X and the column drivers 42A, . . . , 42Y (Block 112). Each row driver 41A, . . . , 41X determines whether its received sync signal pulse is the first it has received after resetting, which occurs at the end of a previous frame or at the beginning of the current frame (Block 113). The recognition of sync signal pulses is determined by signal transitions. Once the first sync signal pulse is received after reset by each row driver 41A, . . . , 41X, each row driver latches an internal bit that remains latched until reset. Subsequent sync signals are not counted and are ignored until reset.

If the sync signal pulse is the first a row driver 41A, . . . , 41X has received after resetting, and if the register Reg2 is storing a 1 which indicates that the row driver is to be activated during the first sub-period of each period (Block 114), then that row driver executes its rows in the current sub-frame within the current frame, and generates a trigger signal pulse at its SCAN_OUT output (Block 116). This row driver then waits for the next sync signal pulse and/or the trigger signal at its SCAN_IN input (Block 117).

If the sync signal pulse is the first that the row driver has received after resetting (Block 113), but the register Reg2 for the row driver is storing a zero value (Block 114), and a trigger signal pulse was received at the SCAN_IN input of the row driver after receipt of the previous sync signal pulse (Block 115), then that row driver executes its rows in the current sub-frame within the current frame, generates a trigger signal pulse at its SCAN_OUT output (Block 116), and waits for the next sync signal pulse and/or the trigger signal at its SCAN_IN input (Block 117).

If the sync signal pulse is the first that the row driver has received after resetting, but the register Reg2 for the row driver is storing a zero value (Block 114), and a trigger signal pulse was not received at the SCAN_IN input of the row driver after receipt of the previous sync signal pulse (Block 115), the row driver waits for the next sync signal and/or the trigger signal at its SCAN_IN input (Block 117).

If the sync signal pulse is the not first that the row driver has received after resetting (Block 113), and a trigger signal pulse was received at the SCAN_IN input of the row driver after receipt of the previous sync signal pulse (Block 115), then that row driver executes its rows in the current sub-frame within the current frame, generates a trigger signal pulse at its SCAN_OUT output (Block 116), and waits for the next sync signal pulse (Block 117).

If the sync signal pulse is not the first that the row driver has received after resetting (Block 113), and a trigger signal pulse was not received at the SCAN_IN input of the row driver after receipt of the previous sync signal pulse (Block 115), the row driver waits for the next sync signal and/or the trigger signal at its SCAN_IN input (Block 117).

The column drivers 42A, . . . , 42Y actuate their channels concurrently with actuation of the channels of each row driver 41A, . . . , 41X according to image data received from the backlight controller 35.

Thus, as compared to the embodiment whose operation is described with flowchart 100, the embodiment whose operation is described by flowchart 110 uses the trigger signal pulses generated by the row drivers 41A, . . . , 41X themselves to determine which row driver is to be activated during what sub-frame of the current frame (other than which row driver is to be activated during the first sub-frame, which is indicated by that row driver's register Reg2 holding a logic 1), as opposed to counting occurrences of the sync signal pulses.

The various described embodiments, through their use of multiplexing (e.g., division of each frame into sub-frames) permit the increase in the number of row drivers present without the increase in the number of column drivers.

It is clear that modifications and variations may be made to what has been described and illustrated herein, without thereby departing from the scope of this disclosure, as defined in the annexed claims. For example, each row driver described above may activate its channels simultaneously, or in groups of desired sizes (for example, in pairs or triplets), instead of in an activation order or sequentially. As another example, the operations above described as being performed by the row drivers may instead be performed by the column drivers (and then the operations described as being performed by the column drivers are instead performed by the row drivers). As a further example, the sync signal pulses and trigger pulses described above may be pulses that transition from low to high, and then from high back to low, or may be pulses that transition from high to low, and then from low back to high. Also, the sync signals and/or the trigger signals may, instead of pulses, be strings of bits or bytes sent to the row drivers and column drivers.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A method of driving a matrix of display elements arranged in rows and columns of backlight zones, with each row being coupled between a plurality of row drivers and a plurality of column drivers, the method comprising:

- sending a synchronization signal indication during each sub-frame of multiple frames to the row drivers and column drivers;
- counting and resetting a synchronization signal count for each row driver;
- activating multiple channels of a row driver when the synchronization signal count is not equal to a first number and equal to a second number; and
- activating at least one channel of each column driver in response to each synchronization signal indication.

2. The method of claim 1, wherein each row driver waits for a next synchronization signal indication when the synchronization signal count is neither equal to the first number nor the second number before activating its channels.

3. The method of claim 1, wherein the synchronization signal indication is sent at a beginning of each sub-frame of the frames.

4. A display system, comprising:

- a plurality of drivers, each driver having multiple channels;
- a matrix of display elements arranged into rows and columns of backlight zones, with each row being coupled to one of the multiple channels of one of the plurality of drivers; and
- a backlight controller coupled to the plurality of drivers, wherein the backlight controller is configured to send a synchronization signal indication during each sub-frame of a plurality of frames to the plurality of drivers;
- wherein each driver is configured to count each synchronization signal indication received to produce a count, and reset the count when the count equals a number of the plurality of drivers, and activate its multiple channels based on the count and a second number indicating the sub-frame in which the driver is to be activated.

5. The display system of claim 4, wherein each driver is configured to wait for a next synchronization signal indication when the count is not equal to the number of the plurality of drivers before activating its multiple channels.

6. The display system of claim 4, wherein each driver is configured to wait for a next synchronization signal indication when the count is not equal to the second number before activating its multiple channels.

7. The display system of claim 4, wherein the plurality of drivers comprise a plurality of row drivers.

8. The display system of claim 4, wherein the synchronization signal indication is a pulse.

9. The display system of claim 4, further comprising a first bus over which the backlight controller sends the synchronization signal indications to the plurality of drivers at a beginning of each sub-frame of each of the plurality of frames.

10. A display, comprising:

a plurality of first drivers, each having multiple channels;

a plurality of second drivers, each having at least one channel;

a matrix of display elements arranged into first and second lines of backlight zones, with each first line being coupled between one of the multiple channels of one of the first drivers and the at least one channel of one of the second drivers; and a backlight controller coupled to the first and second drivers and configured to send a synchronization signal indication during each sub-frame of a plurality of frames;

wherein the plurality of first drivers are row drivers and the plurality of second drivers are column drivers, with the first lines and second lines of backlight zones comprising rows and columns, respectively;

wherein each first driver is configured to count and produce a count, and configured to reset the synchronization signal indication based upon the count, activate its multiple channels based on the count, and wait for a next synchronization signal indication; and wherein each second driver activates its at least one channel in response to each synchronization signal indication.

11. The display of claim 10, wherein the synchronization signal indication is a pulse.

12. The display of claim 10, wherein the backlight controller is configured to send the synchronization signal indication at a beginning of each sub-frame of each frame.

13. The display of claim 10, further comprising a first bus for the backlight controller to send the synchronization signal indications and a second bus for the plurality of first drivers and plurality of second drivers to send signals to the backlight controller.

14. The display of claim 13, wherein the plurality of first drivers and plurality of second drivers send signals to the backlight controller through a first daisy chain connection.

15. The display of claim 10, wherein the plurality of first drivers and plurality of second drivers send signals to the backlight controller through a first daisy chain connection.

16. The display of claim 10, wherein the backlight controller sends the synchronization signal indications to the plurality of first drivers and plurality of second drivers through a second daisy chain connection.

17. The display of claim 16, wherein the plurality of first drivers and plurality of second drivers send signals to the backlight controller through a first daisy chain connection.

18. A display, comprising:

a plurality of first drivers, each having multiple channels;

a plurality of second drivers, each having at least one channel;

a matrix of display elements arranged into first and second lines of backlight zones, with each first line being coupled between one of the multiple channels of one of the first drivers and the at least one channel of one of the second drivers; and a backlight controller coupled to the first and second drivers and configured to send a synchronization signal indication during each sub-frame of a plurality of frames;

wherein the plurality of second drivers are row drivers and the plurality of first drivers are column drivers, with the second lines and first lines of backlight zones comprising rows and columns, respectively;

wherein each first driver is configured to count and produce a count, and configured to reset the synchronization signal indication based upon the count, activate its multiple channels based on the count, and wait for a next synchronization signal indication; and wherein each second driver activates its at least one channel in response to each synchronization signal indication.

19. The display of claim 18, wherein the synchronization signal indication is a pulse.

20. The display of claim 18, wherein the backlight controller is configured to send the synchronization signal indication at a beginning of each sub-frame of each frame.

21. The display of claim 18, further comprising a first bus for the backlight controller to send the synchronization signal indications and a second bus for the plurality of first drivers and plurality of second drivers to send signals to the backlight controller.

22. The display of claim 21, wherein the plurality of first drivers and plurality of second drivers send signals to the backlight controller through a first daisy chain connection.

23. The display of claim 18, wherein the plurality of first drivers and plurality of second drivers send signals to the backlight controller through a first daisy chain connection.

24. The display of claim 18, wherein the backlight controller sends the synchronization signal indications to the plurality of first drivers and plurality of second drivers through a second daisy chain connection.

25. The display of claim 24, wherein the plurality of first drivers and plurality of second drivers send signals to the backlight controller through a first daisy chain connection.

26. A method of driving a matrix of display elements arranged in columns and rows of backlight zones, with each column being coupled between a plurality of column drivers and a plurality of row drivers, the method comprising:

sending a synchronization signal indication during each sub-frame of multiple frames to the column drivers and row drivers;

counting and resetting a synchronization signal count for each column driver;

activating multiple channels of a column driver when the synchronization signal count is not equal to a first number and equal to a second number; and activating at least one channel of each row driver in response to each synchronization signal indication.

27. The method of claim 26, wherein each column driver waits for a next synchronization signal indication when the synchronization signal count is neither equal to the first number nor the second number before activating its channels.

28. The method of claim 26, wherein the synchronization signal indication is sent at a beginning of each sub-frame of the frames.

* * * * *